(12) United States Patent
Wiltzius

(10) Patent No.: US 9,299,076 B2
(45) Date of Patent: Mar. 29, 2016

(54) EMAIL SPAM AND JUNK MAIL AS A VENDOR RELIABILITY SIGNAL

(75) Inventor: Thomas Christian Wiltzius, Santa Barbara, CA (US)

(73) Assignee: Google Inc., Mountain View, CA (US)

(*) Notice: Subject to any disclaimer, the term of this patent is extended or adjusted under 35 U.S.C. 154(b) by 984 days.

(21) Appl. No.: 13/414,639

(22) Filed: Mar. 7, 2012

(65) Prior Publication Data

US 2015/0213456 A1     Jul. 30, 2015

(51) Int. Cl.
| | |
|---|---|
| G06F 15/16 | (2006.01) |
| G06Q 30/00 | (2012.01) |
| G06Q 10/10 | (2012.01) |
| H04M 15/00 | (2006.01) |
| H04L 29/06 | (2006.01) |

(52) U.S. Cl.
CPC ............ G06Q 30/018 (2013.01); G06Q 10/107 (2013.01); H04L 29/06346 (2013.01); H04M 15/8088 (2013.01)

(58) Field of Classification Search
CPC .................. H04M 15/8088; H04L 29/06346
USPC ........................................................ 709/206
See application file for complete search history.

(56) References Cited

U.S. PATENT DOCUMENTS

| | | | |
|---|---|---|---|
| 6,772,196 B1 * | 8/2004 | Kirsch et al. .................. 709/206 |
| 7,899,866 B1 * | 3/2011 | Buckingham ........... H04L 51/12 709/206 |
| 2004/0177120 A1 * | 9/2004 | Kirsch .................. H04L 12/585 709/206 |
| 2005/0091320 A1 * | 4/2005 | Kirsch .................... H04L 51/12 709/206 |
| 2005/0198159 A1 * | 9/2005 | Kirsch .................... H04L 51/12 709/206 |
| 2006/0168024 A1 * | 7/2006 | Mehr ..................... H04L 12/585 709/206 |
| 2006/0253580 A1 | 11/2006 | Dixon et al. |
| 2008/0028443 A1 | 1/2008 | Adelman et al. |
| 2008/0270209 A1 | 10/2008 | Mauseth et al. |
| 2009/0006569 A1 * | 1/2009 | Morss ................... H04L 12/585 709/206 |
| 2011/0087648 A1 | 4/2011 | Wang et al. |

* cited by examiner

*Primary Examiner* — Arvin Eskandarnia
(74) *Attorney, Agent, or Firm* — McDermott Will & Emery LLP

(57) ABSTRACT

A system and method is disclosed for determining a reliability of an online vendor. One or more groups of undesirable emails (for example, spam) are analyzed to determine a prevalence of a known vendor. A reliability indicator may be determined for the vendor based on the identified prevalence of the vendor in the emails. The reliability indicator may then be provided to a remote application for use in assessing the reliability of the vendor.

18 Claims, 4 Drawing Sheets

EMAIL SPAM AND JUNK MAIL AS A VENDOR RELIABILITY SIGNAL

BACKGROUND

The subject technology relates generally to assessing the reliability of online vendors. Assessment of online vendors with regard to their reliability is difficult and a constant challenge for both consumers and the various meta-shopping services that are associated with these vendors. Novice computer users often require assistance in determining whether an online vendor is untrustworthy.

SUMMARY

The subject technology provides a system and computer-implemented method for determining a reliability of an online vendor. According to one aspect, a computer-implemented method may include analyzing one or more groups of emails designated as undesirable to determine a prevalence of one or more known vendors, determining one or more reliability indicators for the one or more known vendors based on the identified prevalence, and providing the one or more reliability indicators to an application. Other aspects include corresponding systems, apparatus, and computer program products for implementation of the computer-implemented method.

In another aspect, a machine-readable may include instructions thereon that, when executed, perform a method for determining a reliability of an online vendor. In this regard, the method may include determining a presence of one or more vendors in a plurality of email messages identified as undesirable, for each identified vendor, determining a reliability indicator based on a prevalence of a characteristic associated with the identified vendor in the plurality of email messages, and providing one or more of the determined reliability indicators to an application. Other aspects include corresponding systems, apparatus, and computer program products for implementation of the method.

A system may include a processor and a memory. The memory may include server instructions that, when executed, cause the processor to determine a presence of one or more vendors in a plurality of email messages identified as spam, and, for each vendor determined to be in the plurality of email messages, determine a normalized value representative of a number of times the vendor appeared in the plurality of email messages compared to other vendors, and provide a representation of the normalized value as a reliability indicator of the vendor to an application used to assess the quality of the identified retailer.

The previously described aspects and other aspects may provide one or more advantages, including, but not limited to, providing an efficient and streamlined method for determining the reliability of one or more vendors that may easily be integrated into an email system to be used on the fly or as part of a nightly batch program, and providing consumers and consumer facing applications simple indicators that may be used in assessing whether online vendors are trustworthy.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The subject technology provides a computer-enabled system and method for determining a reliability of an online vendor. According to one aspect, one signal for estimating the reliability of a vendor (for example, an online retailer) may be based on the amount of spam email received from the vendor. In this regard, the subject technology may include one or more servers may integrated with one or more email accounts to search for and analyze email messages identified by the email accounts as spam. Once spam messages are identified, each spam message may be examined to determine the presence of one or more vendors within the spam message. Generally, the greater the presence of the vendor in the identified spam messages, the less reliable that online vendor may be deemed to be.

Figure 1:
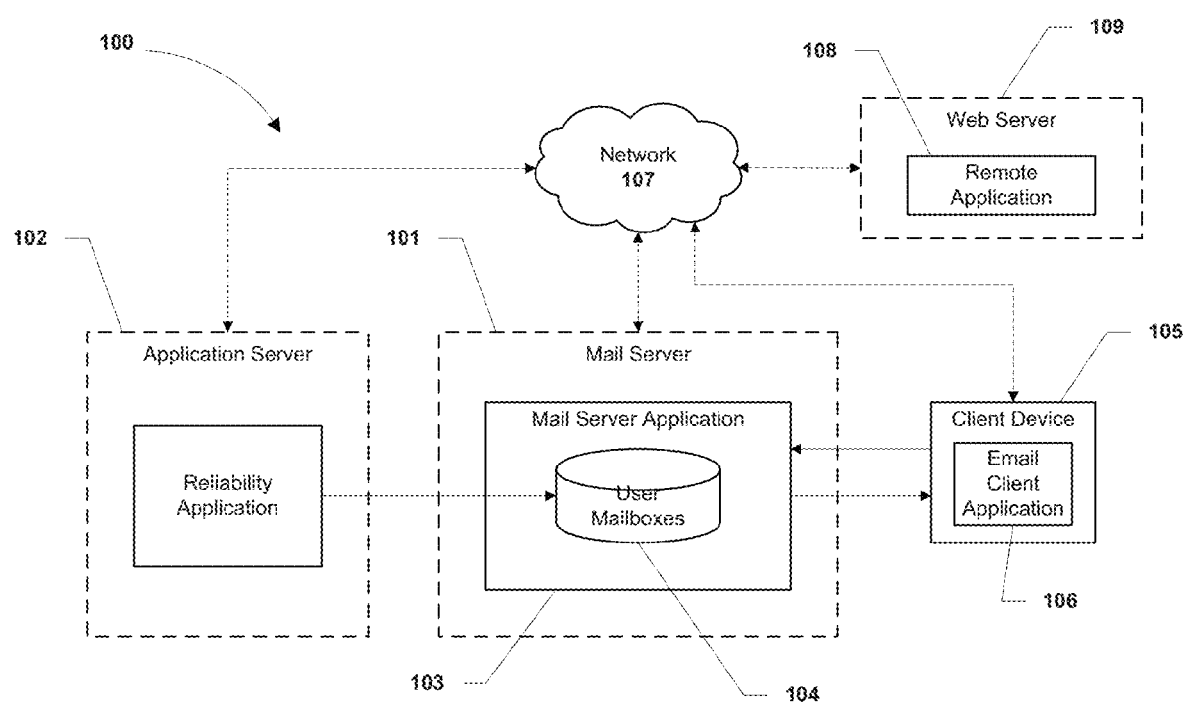
FIG. 1 is a diagram of an example system for determining a reliability of a vendor.

FIG. 1 is a diagram of an example system for determining a reliability of a vendor according to one aspect of the subject technology. As will be described, system 100 may be configured to execute a series of steps to intelligently analyze (for example, examine, scan, process, or the like) emails previously identified (for example by an email system) as having undesirable content (for example, emails indicated to be spam or other junk mail, or as having offensive or otherwise undesirable content based on parameters predetermined by a user). In this regard, system 100 may include a mail server 101 for sending and receiving electronic mail (email) and an application server 102 configured to analyze undesirable emails received by mail server 101, determine vendors responsible for sending all or one or more certain groups of the undesirable emails, and assess the reliability of those vendors based on the analyzed emails.

Mail server 101 may include, for example, a mail server application 103 for sending and receiving email to and from other mail servers or applications. Mail server application 103 may, for example, include a mail transport agent (MTA) and a mail delivery agent (MDA), and/or other components for facilitating the sending or receiving of email. The MTA may manage the process of transferring mail between computers (for example, between mail server 101 and a remote mail server), and the MDA may be responsible for delivery of email to individual user mailboxes 104. User mailboxes 104 may be implemented as a local file system on a hard disk, a database, or other memory device configured for storing incoming and outgoing mail messages. User mailboxes 104 may be implemented on the same physical computing device as mail server 101, located on a different computing device, or distributed among a group of computing devices. Mail server application 103 may provide user access to mail stored in one or more of user mailboxes 104 through a client computing device 105 (for example a personal computer, tablet computer, PDA, smart phone, a television or other display device with one or more computing devices embedded therein or attached thereto, or the like) using a remote mail access protocol, for example, Internet Message Access Protocol (IMAP) or Post Office Protocol 3 (POP3).

Client device 105 may include an email client application 106 (including, for example, a mail user agent) for handling tasks related to the creation and addressing of outgoing mail messages, and retrieving incoming mail messages from user mailboxes 104 on mail server 101. In one aspect, email client application 106 may include a desktop email application located on client device 105, and configured to communicatively connect to mail server 101 over a network 107 (for example, the Internet, an internet, or other network). In another aspect, email client application 106 may include a webmail client: an email client implemented as a web application and accessed through a web browser. In this regard, client device may be a web server and email client application 106 may be accessed by one or more remote client machines operably connected to client device 105 (for example, over network 107).

Application server 102 may also be communicatively connected to mail server 101 over network 107. In this regard, application server 102 may include a reliability application 107 configured to be on operable communication with mail server application 103 and/or one or more user mailboxes 104. For example, mail server application 103 may be integrated with an application programming interface (API) configured to accept communication requests from reliability application 107 to analyze (for example, scan) mail server application 103 and retrieve email information from user mailboxes 104. As will be described in further detail, reliability application 107 may be configured to access one or more user mailboxes 104 to identify a group of undesirable email messages, and determine the presence of one or more vendors within the identified group of undesirable email messages. For each identified vendor, reliability application 107 may determine a reliability indicator (for example, a numeric value) representative of how undesirable emails the vendor has sent to the one or more user mailboxes 104, or to an aggregated group of user mailboxes analyzed over a period of time. Reliability application 107 may provide the reliability indicator to a remote application 108 (for example, a consumer application or website), operating, for example, on a remote web server 109. Remote application 108, and users who access or use remote application 108, may use the reliability indicator to assess the quality of the identified vendor.

Figure 2:
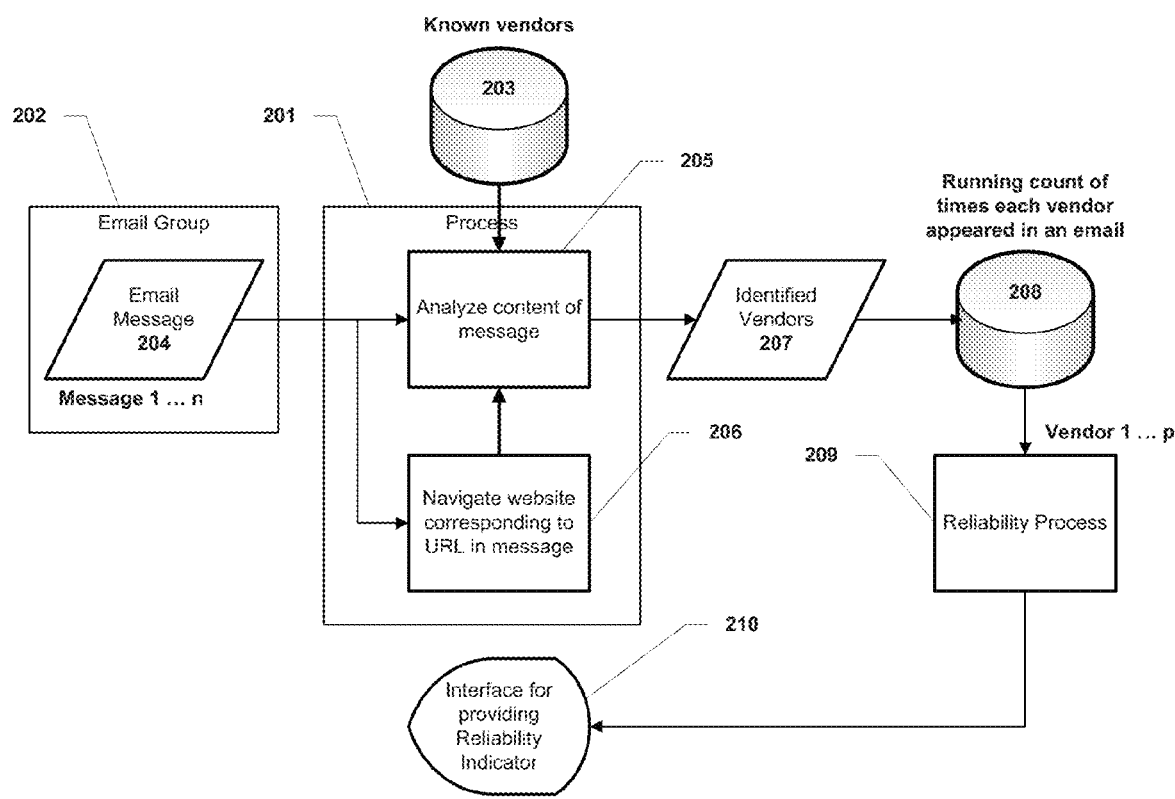
FIG. 2 is a diagram of example processes for determining a reliability of a vendor.

FIG. 2 is a diagram of example processes for determining a reliability of a vendor according to one aspect of the subject technology. The subject technology provides one or more computing devices (for example, application server 102) configured to execute one or more processes (for example, batch processes), including algorithms directed to implementing the methods described herein. A first process 201 may analyze one or more groups of emails 202 to identify a presence of one or more known vendors. The one or more known vendors may include vendors that have been identified by a previous process as being untrusted (for example, suspect, not reliable, or the like), stored in a storage location 203 (for example, a local or remote database), and retrieved from storage location 203 at runtime by first process 201.

An email group 202 may include one or more emails 204 identified by the corresponding email system as having undesirable content. First process 201 may analyze email group 202 from one email account, or may analyze an aggregate of multiple groups 202 from multiple respective email accounts. Additionally or in the alternative, an email group 202 of undesirable emails may include emails identified as undesirable by a user or labeled or placed in a folder identified (for example, flagged) as being associated with undesirable emails. On detecting the presence of a known vendor in an identified email message 204, first process 201 may associate the identified email message with the known vendor.

Determining the presence of a known vendor may include analyzing a group of email messages 204 to determine whether one or more of email messages 204 include one or more characteristics associated with the vendor. In this regard, first process 201 (for example, in a first subprocess 205) may analyze each email message 204 and determine whether the email contains one or a plurality of stored vendor characteristics. Vendor characteristics may have been stored, for example, in storage location 203 indexed by vendors, by a previous process. On detecting a vendor characteristic, the email may be associated with the vendor associated with the characteristic. Vendor characteristics may include attributes (for example, at least a portion of an electronic address, URL, domain name or a partial domain name, or the like), one or more terms (for example, a name or partial name of a vendor), an image, or the like, associated with one or more known vendors, or that are known to exist in emails or websites associated with the one or more known vendors. In another example, email messages 204 may be analyzed for other information, for example, uncommon or unique terms, or collections or patterns of terms, that are known to exist in emails and/or websites associated with the known vendors. Email messages 204 may also be searched for attributes (for example, a URL) corresponding to an image known to exist on a website of a known vendor (for example, a logo), or for an image corresponding to an attribute (for example, a URL) of the vendor.

In another aspect, first process 201 (for example, in a second subprocess 206) may identify one or more links (for example, hyperlinks) embedded within content of an analyzed email message 204 (for example, in the displayed text or HTML code), and then attempt to navigate the one or more links to determine one or more online resources (including, for example, a website, webpage, video or audio file, document, or the like) corresponding to the one or more links. Once the resource is identified, the characteristics of the resource (for example, terms or patterns of terms users, graphics, or the like) may be analyzed using the previously described techniques to determine the known vendors associated with the resource.

First process 201 may generate a list 207 of known vendors whose presence has been detected, and store the identified vendors in a second storage location 208. Additionally or in the alternative, the identified vendors may be stored in one or more different database tables of first storage location 203, or set a flag associated with the detected vendors in first storage location 203, or the like. Moreover, the functionality of first storage location 203 and second storage location 208 may be implemented in the same storage or distributed across a plurality of storages. The storages may take any form such as relational databases, object-oriented databases, file structures, text-based records, or other forms of data repositories.

In some aspects, a reliability process 209 may determine a prevalence of the one or more known vendors determined to be present in the analyzed email messages 204. For each known online vendor, reliability generator 209 (for example, a software process executed by the one or more servers) may determine a count of how many times the vendor appeared in a group of email messages 204, including, for example, in any linked resources. The prevalence of the one or more characteristics may, for example, be a numeric value determined from a number of times the characteristic appears in the one or more groups of emails, or, in some aspects, a number of emails messages 204 (for example, in one or more groups of emails) that include the characteristic, or the like. The value may be normalized with regard to how many times other vendors appear in the analyzed messages, an aggregate set of messages or sample set of messages, and converted to a reliability value (for example, a numerical or letter-based score). Reliability process 209 may then provide the reliability value to an application. For example, the reliability value may be provided through, for example, an interface 210 (for example, through a web service, a query of storage location 108, or the like) to a website, web application, or one or more meta-shopping services operating, for example, on remote web server 109 of FIG. 1.

The functionality of reliability process 209 and first process 201 may be implemented in the same process or distributed across a plurality of separate processes. Similarly, reliability process 209 may be implemented on the same physical computing device as first process 201, located on a different computing device, or distributed among a group of computing devices.

Figure 3:
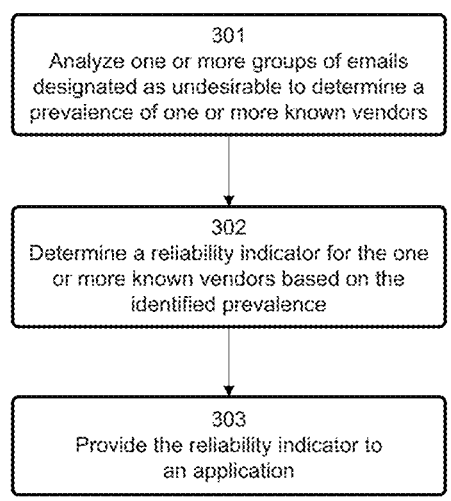
FIG. 3 is a flowchart illustrating an example process for determining a reliability of a vendor.

FIG. 3 is a flowchart illustrating an example process for determining a reliability of a vendor. According to one aspect, one or more processes (for example, first process 201) may be executed by a computing device (for example, application server 102) to determine a reliability of an online vendor. In step 301, one or more one or more groups of emails designated as undesirable may be analyzed to determine a prevalence of one or more known vendors. Analyzing the one or more groups may include, for example, determining a prevalence of one or more characteristics associated with the one or more known vendors. For example, a process may have access to a plurality of stored characteristics, each associated with a vendor, and perform a search of the one or more groups of emails to determine whether one or more of the characteristics is present in each email. If a characteristic is identified as being present in an email, then the email may be associated with the vendor corresponding to the identified characteristic. The prevalence of a vendor may then be determined by a count based on the number of times a characteristic associated with the vendor was detected in the one or more groups of analyzed emails, how many emails included the characteristic, or the like.

In step 302, one or more reliability indicators are determined for the one or more known vendors based on the identified prevalence. In this regard, a reliability indicator may be determined for each identified vendor, or for a group of vendors. A reliability indicator may be a numeric representation of the previously described count, a normalized value thereof, or another representation of the prevalence of the corresponding vendor, or the like. In step 303, the one or more reliability indicators are provided to an application (for example, a remote application).

Figure 4:
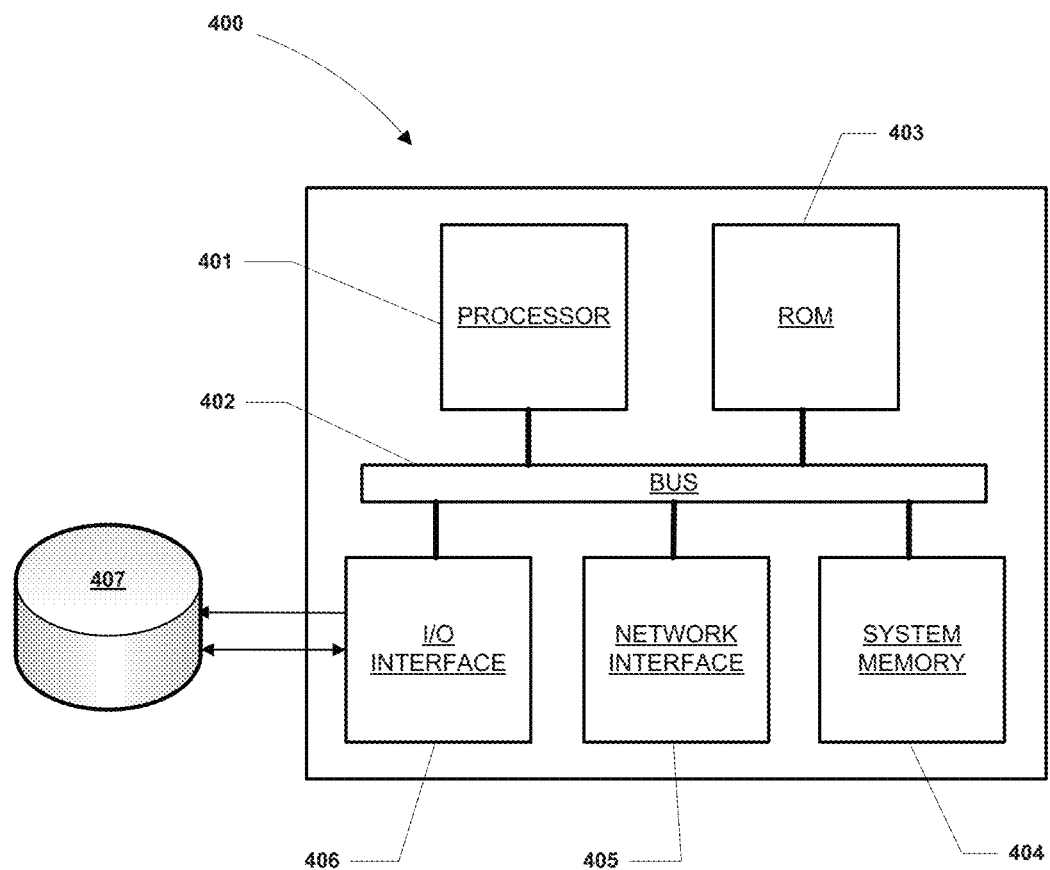
FIG. 4 is a diagram illustrating an example machine or computer for determining a reliability of a vendor, including a processor and other internal components.

FIG. 4 is a diagram illustrating a machine or computer for determining a reliability of a vendor, including a processor and other internal components, according to one aspect of the subject technology. In some aspects, a computerized device 400 (for example, mail server 101, application server 102, client device 105, web server 109, or the like) includes several internal components, for example, a processor 401, a system bus 402, read-only memory 403, system memory 404, network interface 405, I/O interface 406, and the like. In one aspect, processor 401 may also be in communication with a storage medium 407 (for example, a hard drive, database, or data cloud) via I/O interface 406. In some aspects, all of these elements of device 400 may be integrated into a single device. In other aspects, these elements may be configured as separate components.

Processor 401 may be configured to execute code or instructions to perform the operations and functionality described herein, manage request flow and address mappings, and to perform calculations and generate commands. Processor 401 is configured to monitor and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 401. Likewise, one or more sequences of instructions may be software stored and read from system memory 405, ROM 403, or received from a storage medium 407 (for example, via I/O interface 406). ROM 403, system memory 405, and storage medium 407 represent examples of machine or computer readable media on which instructions/code may be executable by processor 401. Machine or computer readable media may generally refer to any medium or media used to provide instructions to processor 401, including both volatile media, for example, dynamic memory used for system memory 404 or for buffers within processor 401, and non-volatile media, for example, electronic media, optical media, and magnetic media.

In some aspects, processor 401 is configured to communicate with one or more external devices (for example, via I/O interface 406). Processor 401 is further configured to read data stored in system memory 404 or storage medium 407 and to transfer the read data to the one or more external devices in response to a request from the one or more external devices. The read data may include one or more web pages or other software presentation to be rendered on the one or more external devices. The one or more external devices may include a computing system, for example, a personal computer, a server, a workstation, a laptop computer, PDA, smart phone, and the like.

In some aspects, system memory 404 represents volatile memory used to temporarily store data and information used to manage device 400. According to one aspect of the subject technology, system memory 404 is random access memory (RAM), for example, double data rate (DDR) RAM. Other types of RAM also may be used to implement system memory 404. Memory 404 may be implemented using a single RAM module or multiple RAM modules. While system memory 404 is depicted as being part of device 400, it will be recognized that system memory 404 may be separate from device 400 without departing from the scope of the subject technology. Alternatively, system memory 404 may be a non-volatile memory, for example, a magnetic disk, flash memory, peripheral SSD, and the like.

I/O interface 406 may be configured to be coupled to one or more external devices, to receive data from the one or more external devices and to send data to the one or more external devices. I/O interface 406 may include both electrical and physical connections for operably coupling I/O interface 406 to processor 401, for example, via the bus 402. I/O interface 406 is configured to communicate data, addresses, and control signals between the internal components attached to bus 402 (for example, processor 401) and one or more external devices (for example, a hard drive). I/O interface 406 may be configured to implement a standard interface, for example, Serial-Attached SCSI (SAS), Fiber Channel interface, PCI Express (PCIe), SATA, USB, and the like. I/O interface 406 may be configured to implement only one interface. Alternatively, I/O interface 406 may be configured to implement multiple interfaces, which are individually selectable using a configuration parameter selected by a user or programmed at the time of assembly. I/O interface 406 may include one or more buffers for buffering transmissions between one or more external devices and bus 402 or the internal devices operably attached thereto.

Various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description provides various examples of the subject technology, and the subject technology is not limited to these examples. Various modifications to these aspects will be readily apparent, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for determining a reliability of an online vendor, the method comprising:
   analyzing one or more groups of received emails designated as undesirable to determine a prevalence of one or more known vendors in content portions of the received emails designated as undesirable;
   identifying one or more links in the one or more groups of received emails;
   analyzing at least a portion of one or more websites corresponding to the one or more links, wherein the prevalence of the one or more known vendors includes a prevalence of the one or more known vendors in the analyzed one or more websites;
   determining one or more reliability indicators for the one or more known vendors based on the identified prevalence of the one or more known vendors in the content portions of the received emails designated as undesirable; and
   providing the one or more reliability indicators to an application.

2. The computer-implemented method of claim 1, wherein analyzing the prevalence of the one or more known vendors comprises:
   analyzing the one or more groups of emails to determine a prevalence of one or more characteristics associated with the one or more known vendors in the content portions of the received emails.

3. The computer-implemented method of claim 2, wherein the prevalence of the one or more characteristics includes a number of times the characteristic appears in the one or more groups of received emails.

4. The computer-implemented method of claim 2, wherein the prevalence of the one or more characteristics includes a number of emails which include the characteristic.

5. The computer-implemented method of claim 2, wherein the one or more characteristics include at least a portion of an electronic address associated with one or more respective known vendors.

6. The computer-implemented method of claim 2, wherein the one or more characteristics include one or more terms associated with one or more respective known vendors.

7. The computer-implemented method of claim 6, wherein the one or more terms include a name or partial name.

8. The computer-implemented method of claim 2, wherein the one or more characteristics include an image associated with one or more respective known vendors.

9. The computer-implemented method of claim 1, the method further comprising:
   identifying one or more predetermined untrusted vendors, wherein the one or more known vendors includes the one or more predetermined untrusted vendors.

10. A non-transitory machine-readable media including instructions thereon that, when executed, perform a method, the method comprising:
- identifying one or more vendors that are present in content portions of a plurality of received email messages identified as undesirable;
- determining a prevalence in the content portions of the plurality of received email messages of a characteristic associated with the identified one or more vendors;
- determining one or more links in one or more of the email messages identified as undesirable;
- analyzing one or more online resources corresponding to the one or more links;
- for each identified vendor, determining a reliability indicator based on the prevalence of the characteristic in the content portions of the plurality of received email messages and based on a prevalence of the characteristic in the one or more online resources; and
- providing one or more of the determined reliability indicators to an application.

11. The non-transitory machine-readable media of claim 10, wherein the step of identifying the one or more vendors in the content portions of the plurality of received email messages comprises:
- for each identified vendor, analyzing the content portions of the plurality of received email messages to identify one or more email messages that include the characteristic; and
- for each identified email message, associating the email message with a known vendor associated with the corresponding characteristic.

12. The non-transitory machine-readable media of claim 10, wherein the characteristic of the identified vendor includes at least a portion of a name.

13. The non-transitory machine-readable media of claim 10, wherein the characteristic of the identified vendor includes one or more terms associated with the identified vendor.

14. The non-transitory machine-readable media of claim 10, wherein the characteristic of the identified vendor includes one or more images associated with the identified vendor.

15. The non-transitory machine-readable media of claim 10, wherein the plurality of received email messages are identified as undesirable by instructions associated with one or more email accounts responsible for managing the plurality of email messages.

16. The non-transitory machine-readable media of claim 10, wherein determining the reliability indicator comprises:
- determining a normalized value representative of a number of times the characteristic appeared in the content portions of the plurality of received email messages compared to other vendors.

17. The non-transitory machine-readable media of claim 10, wherein one or more online resources includes at least a portion of one or more websites.

18. A system, comprising:
- a processor; and
- a memory, including server instructions that, when executed, cause the processor to:
  - determine a presence of one or more vendors in content portions of a plurality of received email messages identified as spam;
  - identify one or more links in the one or more groups of received emails;
  - analyze at least a portion of one or more websites corresponding to the one or more links;
  - determine a prevalence of the one or more known vendors in the analyzed one or more websites; and
  - for each vendor determined to be in the plurality of received email messages,
  - determine a normalized value representative of a number of times the vendor appeared in the content portions of the plurality of received email messages compared to other vendors, and
  - provide a representation of the normalized value as a reliability indicator of the vendor to an application used to assess the quality of the identified retailer.

* * * * *